United States Patent
Arnold

(12) 
(10) Patent No.: US 6,271,614 B1
(45) Date of Patent: Aug. 7, 2001

(54) PULSED PLASMA DRIVE ELECTROMAGNETIC MOTOR GENERATOR

(76) Inventor: Christopher J. Arnold, P.O. Box. 955, Lombard, IL (US) 60148

( * ) Notice: Subject to any disclaimer, the term of this patent is extended or adjusted under 35 U.S.C. 154(b) by 0 days.

(21) Appl. No.: 09/440,151

(22) Filed: Nov. 15, 1999

Related U.S. Application Data

(60) Provisional application No. 60/109,348, filed on Nov. 20, 1998.

(51) Int. Cl.[7] ............................. H05H 1/46; H02K 23/02
(52) U.S. Cl. ...................... 310/233; 310/273; 250/423 R
(58) Field of Search ......................... 310/11, 273, 231, 310/233, 236; 439/130, 131, 291, 294, 337, 950; 315/111.41, 111.51, 111.21, 111.31; 219/121.48, 121.36; 356/316; 313/231.41, 231.51, 231.61; 250/426, 423 R

(56) References Cited

U.S. PATENT DOCUMENTS

| | | | |
|---|---|---|---|
| 512,340 | 1/1894 | Tesla | 336/222 |
| 685,957 | 12/1901 | Tesla | 359/171 |
| 3,386,883 * | 6/1968 | Farnsworth | 376/107 |
| 4,167,685 | 9/1979 | Bates | 310/237 |
| 4,277,306 * | 7/1981 | Ohkawa | 376/135 |
| 4,291,255 * | 9/1981 | Alexeff | 315/340 |
| 4,343,356 * | 8/1982 | Riggs et al. | 166/60 |
| 4,482,830 | 11/1984 | Iwaki | 310/113 |
| 4,716,330 | 12/1987 | Heyraud | 310/233 |
| 4,720,662 | 1/1988 | Lanser | 318/138 |
| 4,780,608 * | 10/1988 | Cross et al. | 250/281 |
| 4,891,180 * | 1/1990 | Koloc | 376/144 |
| 5,034,183 | 7/1991 | Blewett | 376/107 |
| 5,068,884 * | 11/1991 | Choe et al. | 378/119 |
| 5,126,638 * | 6/1992 | Dethlefson | 315/326 |
| 5,153,901 | 10/1992 | Shoulders | 378/119 |
| 5,208,844 | 5/1993 | Puthoff | 378/122 |
| 5,359,248 | 10/1994 | Nagate | 310/156 |
| 5,408,165 | 4/1995 | Voet | 318/523 |
| 5,416,391 * | 5/1995 | Correa et al. | 310/558 |
| 5,661,354 | 8/1997 | Burtis | 310/113 |
| 5,757,093 * | 5/1998 | Susliaev et al. | 310/24 |
| 5,861,693 | 1/1999 | Takahashi | 310/113 |
| 5,935,461 * | 8/1999 | Witherspoon et al. | 219/121.59 |
| 5,986,378 * | 11/1999 | Caamaño | 310/216 |
| 6,029,438 * | 2/2000 | Hosick | 60/202 |
| 6,140,657 * | 10/2000 | Wakalopulos et al. | 250/492.3 |

OTHER PUBLICATIONS

"The Particle Explosion" by Frank Close et al., Oxford University Press, 1987 (month unknown), pp. 54–55.*
"Physics for the Modern Mind" by Walter Robert Fuchs, MacMillan, 1967 (month unknown), p. 307.*
"Atomic Physics in Hot Plasmas" by David Salmon, Oxford University Press, 1998 (month unknown), preface.*
The Fundamentals of X–ray and Radium Physics by Joseph Selman, M.D., published by C.C. Thomas, 1978 (month unknown), pp. 159–163.*

* cited by examiner

Primary Examiner—Elvin Enad
Assistant Examiner—Judson H. Jones

(57) ABSTRACT

A power generating electromagnetic motor (2) which comprises a novel pulsed plasma commutator (22) in conjunction with a bipolar magnetic rotor (16) made of high $BH_{max}$ permanent magnets (14) affixed to a core element (18) disposed coaxially with drive coil (12) with an air gap there between and providing an adjacent receiving coil (10) for discrete, particle and wave recapture as well as by array (80). The commutator (22) propels the drive coil assembly (8) with a series of intermittent pulses as well as producing unique power outputs and discrete particles and waves in the resultant plasma, such as Electrum Validum or EV and furthermore is the unique presence of system negative entropy.

16 Claims, 8 Drawing Sheets

GRAPH INDICATES TWO CYCLES

PULSED PLASMA DRIVE ELECTROMAGNETIC MOTOR GENERATOR

CROSS REFERENCES TO RELATED APPLICATIONS

This application claims the benefit of Provisional Patent Application Ser. No. 60/109,348 filed Nov. 20, 1998.

BACKGROUND—FIELD OF INVENTION

This invention relates to spark control on the commutator, specifically zero spark suppression whereby full cycle sparking and plasma streams with resultant charge clusters, radiation, electromotive force, discrete wave and discrete particle generation are achieved.

BACKGROUND—DESCRIPTION OF PRIOR ART

All previous commutators used in DC motors or generators have been designed to reduce sparking by elaborate means whereby no examples are referable as similar, only contrary by means. Traditional design goals have been to reduce commutator sparking, yet complete suppression seems to be mythical. The common physical effects include hysteresis, inductive and conductive heating in the armature and rotor facilitating the need for heavy gauge 600 degree insulated conductors, special heat resistant bonding agents, and air flow cooling means which further reduces efficiency. Sparking by itself adds to commutator erosion and added heating, also requiring cooling. Counter electromotive force, generally referred to as counter-EMF is evident in both modern and historic patent designs and has been considered something to avoid. Likewise the effects of the Collapsing Magnetic Field, further referred to as CMF, is caused when a complete break in the circuit occurs at the commutator resulting in conductor erosion and copious heat production.

(a) When a motor/generator uses laminate steel as an armature or coil support, it is these laminates which add useless weight, carry eddy currents & interfere with permanent and generated magnetic fields.

(b) Counter-EMF also contributes to magnetic braking which requires additional current to drive the motor to required speed.

(c) Past motor/generator design had only low flux density magnets available to them, requiring application of greater currents to drive the electromagnetic fields. This resulted in high internal heat which proved problematic for the high $BH.sub.max$ permanent magnets otherwise known as neodymium iron boron, having a relative low curie point.

(d) U.S. Pat. No. 5,861,693 Takahashi: Yoshiaki (Jan. 19, 1999) is for a motor using now conventional components such as high $BH.sub.max$ permanent magnets, however its use of steel laminates causes drag within the high strength magnetic fields, creating useless heat and further built-in inefficiencies to overcome. Furthermore his use of induction coils to produce electricity is not new as evidenced in U.S. Pat. 5,661,354 to Burtis; Wilson A. (Aug. 26, 1997), U.S. Pat. No. 5,408,165 to Voet; Eduard J. (Apr. 18, 1995) and U.S. Pat. No. 4,720,662 to Lanser; Leslie V. (Jan. 19, 1988) . These methods seem to rely on the lines of force from the permanent magnetic field cutting through the conductor to produce a flow of current as in a standard generator. This is known and indicated by Takashi when he states, a lower power consumption by omitting the induction coil from the above mentioned motor.

(e) In U.S. Pat. No. 5,208,844 to Puthoff: Harold E(Austin, Tex.); Church,Jr.; George W.(San Antonio, Tex.); Clifton; David B.(Leander, Tex.); Little; Scott R. (Austin, Tex.) (May 4, 1993) and U.S. Pat. 5,153,901 to Shoulders; Kenneth R.(Austin Tex.) (Oct. 6, 1992) we find the use of voltages at a high potential, near 30 KeV and bulky equipment are needed to produce charged particle clusters, radiation, Electrum Validum or EV and possible Nuclear Electrum Validum or NEV effects, however system charge times are not mentioned and presumed slow. In U.S. Pat. No. 5,034,183 to Blewett; John P. (Jul. 23, 1991) it states that tritium production occurs as well as producing anti-protons at multi-GeV energies, specifically anti-hydrogen.

(f) U.S. Pat. No. 512,340 to Tesla; Nikola (Jan. 9, 1894) and U.S. Pat. No. 685,957 to Tesla; Nikola (Dec. 5, 1901) might be of use herein, however my system is not limited to DC motor operation, it also has means for sub-atomic particle discovery.

SUMMARY INCLUDING OBJECTS AND ADVANTAGES

A pulsed plasma electromagnetic motor, comprises a novel commutator, a hermetically sealed plasma area, energy sensors, a pulsed plasma flow of voltage allowing DC motor operation, charged particle clusters, discrete particles, discrete waves, having means of radiated energy retrieval, x-ray transmission and anti-matter factors are present.

OBJECTS AND ADVANTAGES

Accordingly, several objects and advantages of my invention are the novel use of unsuppressed sparking to generate a multitude of heretofore unrealized effects in an electromagnetic motor of unique properties using a standard coil and rotor design. This novel approach insures absolute zero spark suppression, thereby allowing a pulsed field motor/generator to access heretofore unavailable energies from the CMF as well as now useful counter-EMF forces which have caused commutator destruction as far back as the first electric motor in circa 1835. This unique electrical transmission means allows advantages far in advance of simple use in motor/generators. High energy particle division and associated transmutation at sub-GeV, even sub KeV applied energies now seems possible.

The phrase "motor/generator is being used to describe a device which produces power during a part of the operating cycle when no active drive power is applied to the system. Harnessing that power would increase the efficiency of the machine, or the power could be directed to a secondary device.

Still further objects and advantages will become apparent from a consideration of the ensuing description and accompanying drawings. Other possible effects are the generation of positrons, anti-matter, gravity waves, magnetic vortexes and an altered space-time reference from one or more of the following; rotating magnetic fields, pulsed magnetic field, EV and emitted radiation resultant of charged particle clusters, Electromagnetic Pulse or EMP and regenerative means, CMF and counter-EMF containment in a resonant circuit, eddy current suppression. Regardless of theory, the groundbreaking discovery of negative Entropy or heat loss has been evidenced therewith repeatedly in the system.

(a) The use of steel laminates near high $BH.sub.max$ magnets, results in system drag as these magnets are attracted to even stainless steel, thereby laminate use is to be avoided. As magnetic attraction to aluminum, copper and other metals is evident, the novel use of non-conductive support elements is suggested, whereby hysteresis and eddy currents can not propagate. Support elements include coil supports, housing & core elements. Use of extraneous conductors should be limited to standard exterior RF shielding as required, however this may be at a distance depending on requirements, in example a test room shield.

(b) Previous commutation means lead to suppress counter-EMF as it causes magnetic braking which must be overcome by applying higher driving currents to counter its effects, thus causing an increase in system heating resulting in, removal means and requiring excess insulation and increased wire gauge. Whereas my novel commutator not only refuses to neutralize counter-EMF but transmutes its use into increased system performance, whereby small wire gauge transmission means are possible as current flow is restricted within this system and even substantial lengths of fine 38 GA wire can be used with minimal thermal radiation, and at times remission.

(c) High BH.sub.max permanent magnets with a field strength higher than 36 MGOe such as 50 MGOe, 100 MGOe and higher are required for specific function in my devices.

(d) Induction coils as such are not used, the function of the receiving coils are to collect discrete and tuned energies radiated from the pulsed electromagnetic field and should be positioned at a distance, not to interfere with but receive the signal for transformation. The receiving coil can envelope the drive coil or be placed adjacent to it, whereby under direct short circuit should not cause substantial drag on the magnetic core due to induction, as this is not its main energy collection goal.

(e) Whereas others use KeV and GeV charges to attain particle separation and system charge times vary, my system demands are fractional in comparison. In my device the system supply voltage is fractional however voltage potential within the plasma is extremely high, contained, and fast in cycle. A rate of 2,200 plasma discharges per second is normal and even if a potentially smaller particle separation were to be expected in each cycle, an increased efficiency over current devices would be anticipated.

(f) Due to the extremely low power consumption of my device, the patents of Nikola Tesla from the past may shed new light in the future as well as provide a means to capture at least some of the needed energy to run, as well as recapture radiated energies from within this system. A suitable antenna can be used to recapture the energy, however meager required to sustain core movement.

Figure 1:
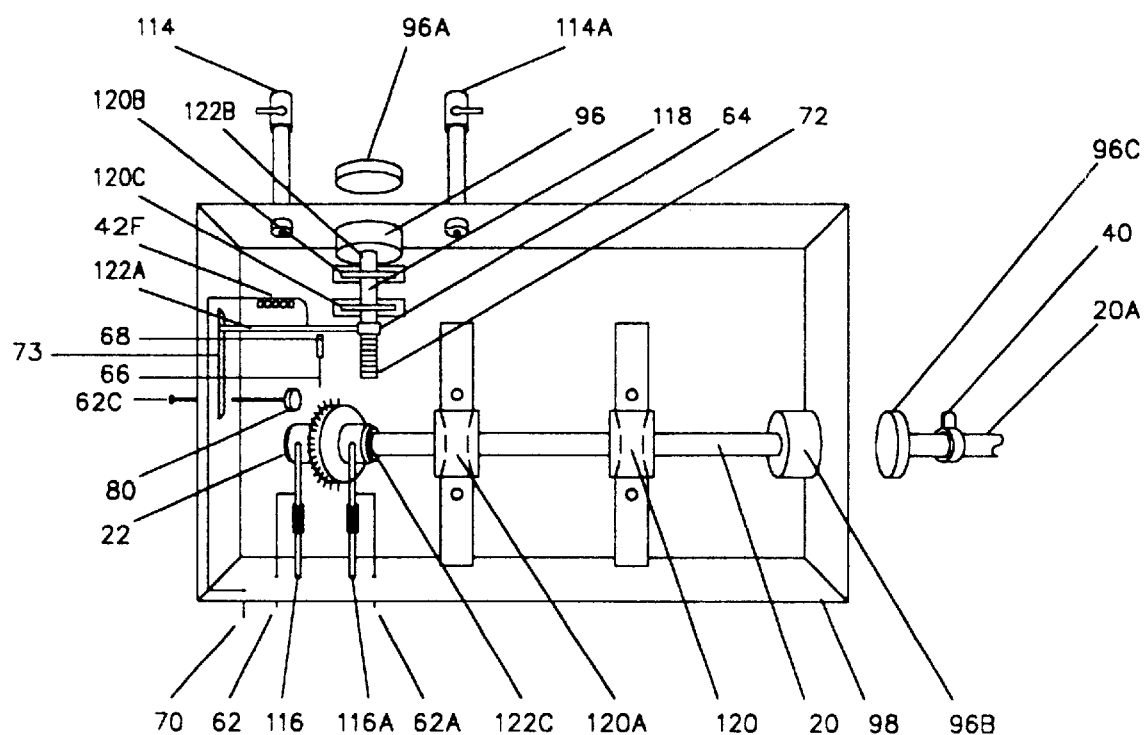
FIGS. 1 and 1a are a two part view of my invention.
Figure 3A:
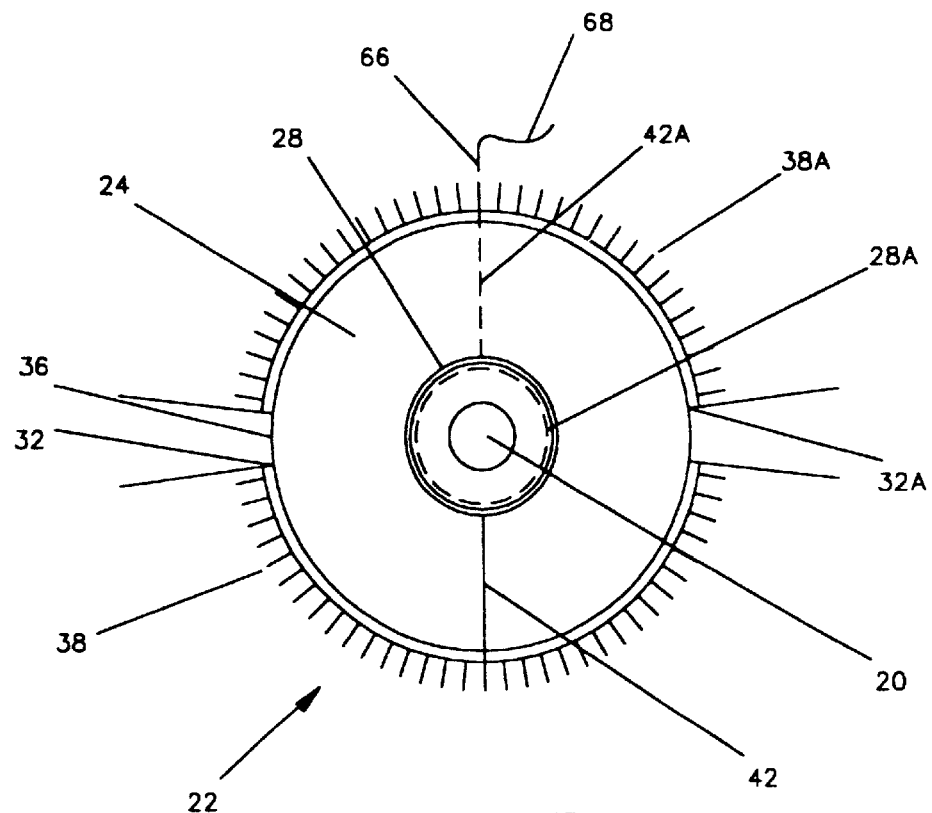
FIGS. 3 and 3a show two views of the commutator.
Figure 3:
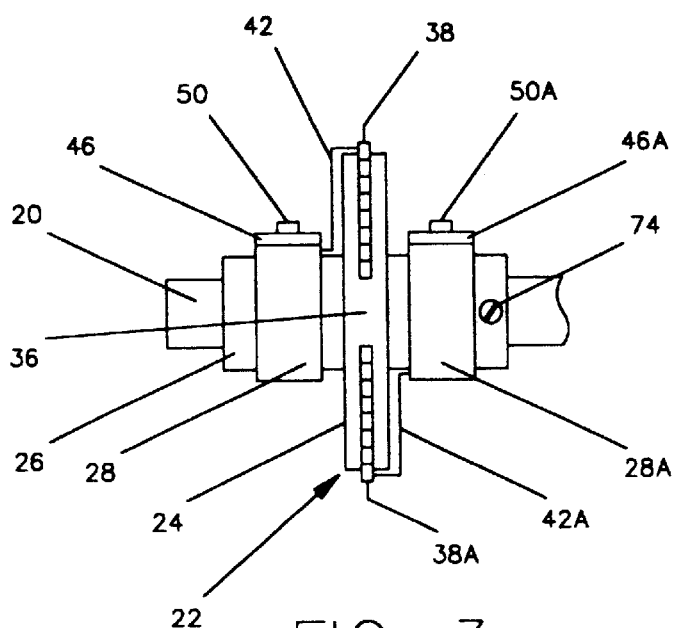

REFERENCE NUMERALS 9 power generating electromagnetic motor
10 receiving coil
12 drive coil
12A drive coil
13 drive coil assembly
14 high BH.sub.max permanent magnet
14A high BH.sub.max permanent magnet
16 bi-polar magnetic rotor
18 core element
18A core element
20 shaft
20A shaft
20B shaft
22 pulsed plasma commutator
24 non conductive disk
26 shaft insulator tube
28 annular conductive ring
28B annular conductive ring
30 pulsed solenoid
32 arched lobe
32A arched lobe
36 peripheral surface
36A peripheral surface
36B peripheral surface
38 radial contacts
38A radial contacts
40 momentary starter
42 conductor wire
42A conductor wire
42B conductor wire
42C conductor wire
42D conductor wire
42E conductor wire
42F conductor wire
44 pulsed plasma spark gap
46 ring contact bar
46A ring contact bar
50 tension bar
50A tension bar
54 tension spring
54A tension spring
62 terminal
62A terminal
62C terminal
64 primary firing assembly
66 primary contact
66A primary contact
68 primary contact holder
70 primary conductor terminal
72 primary adjustment means
72A primary adjustment means
73 primary guild
74 tube retainer
78 drive coil wire
78A drive coil wire
78B drive coil wire
78C drive coil wire
82 capacitor
82A capacitor
84 capacitor terminal
84A capacitor terminal
86 wire
86A wire
86B wire
86C wire
86D wire
86E wire
86G wire
86H wire 86I wire
86J wire
88 DC battery
88A DC battery
90 battery terminal
90A battery terminal
90B battery terminal
90C battery terminal
92 junction
92A junction
92B junction
94 spring bar
94A spring bar
96 magnetic coupler
96A magnetic coupler
96B magnetic coupler
96C magnetic coupler
98 hermetically sealed container
100 bonding filler
114 valve
114A valve
116 post
116A post
118 threaded bar
120 bearing
120A bearing
120B bearing
120C bearing
122 point
122A point
122B point
122C point
122D point
122E point
122F point
124 frame
126 contact
128 slot Preferred Embodiment—Description Referring to FIG. 1, a power generating electromagnetic motor 9 consisting of a drive coil assembly 13 attached to a magnetic coupler 96C adjacent to a hermetically sealed container 98, which contains a magnetic coupler 96B so attached at point 122B is a shaft 20 journaled through a bearing 120 and a bearing 120A, at point 122C a novel pulsed plasma commutator 22 as detailed in FIG. 3, is secured by a tube retainer 74 in a shaft insulator tube 26 so affixed is a non conductive disk 24, thereon its peripheral face 36 is an arched lobe 32 holding radial contacts 38, said arched lobe 32 is affixed to a conductor wire 42 so affixed to an annular conductive ring 28 in sliding contact with a ring contact bar 46 so affixed to a tension bar 50 so attached to said conductor wire 42 ending at terminal 62 and said tension bar 50 is attached to a tension spring 54 terminating at post 116. Counterpoised to said arched lobe 32 on said peripheral face 36 are radial contacts 38A so affixed to an arched lobe 32A so affixed to a conductor wire 42A so connected to an annular conductive ring 28A being in sliding contact with a ring contact bar 46A so attached to a tension bar 50A having a conductor wire 42C which ends at terminal 62A and said tension bar 50A is so attached to a tension spring 54A terminating at post 116A.

Referring to FIG. 3 primary adjustment means 72 has a magnetic coupler 96A with a suitable locking device outside of said hermetically sealed container 98 being magnetically coupled to a magnetic coupler 96 so affixed to a point 122B of a threaded bar 118 secured by a bearing 120B and a bearing 120C whereas said threaded bar 118 is journaled through a primary firing assembly 64 at point 122A, to said assembly 64 is attached a primary point holder 68 where a primary contact 66 is affixed, said primary firing assembly 64 terminates in a primary guild 73 and said holder 68 has affixed a conductor wire 42F which so ends at primary conductor terminal 70 and said hermetically sealed container 98 is so equipped with a valve 114 and a valve 114A for vacuum or gas insertion into said hermetically sealed container 98.

Figure 1A:
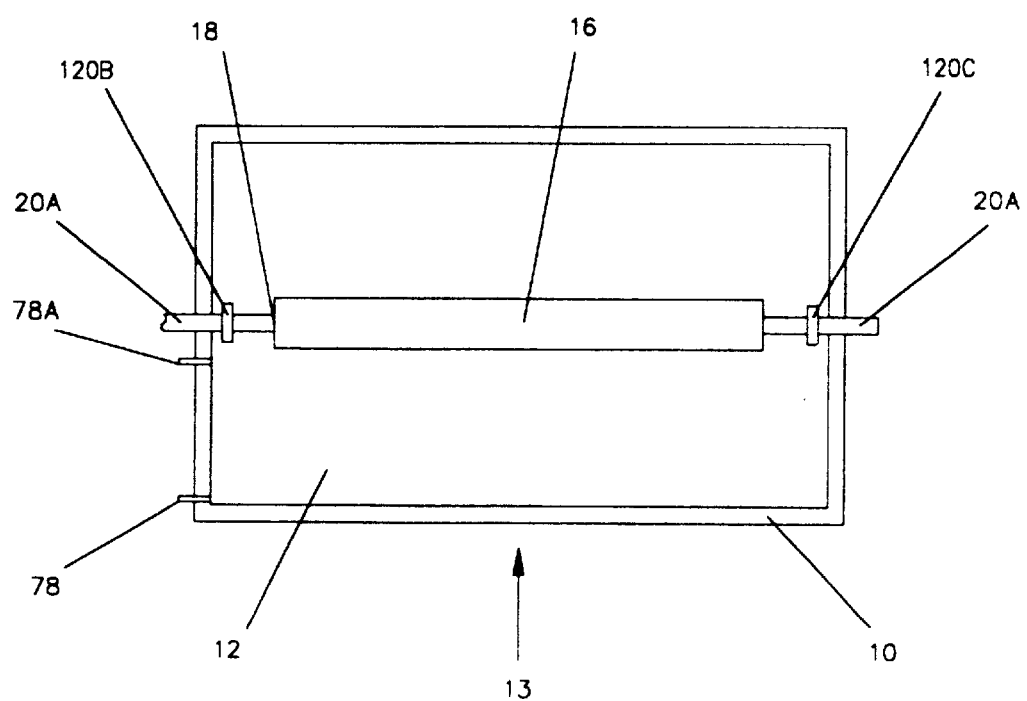
Figure 2:
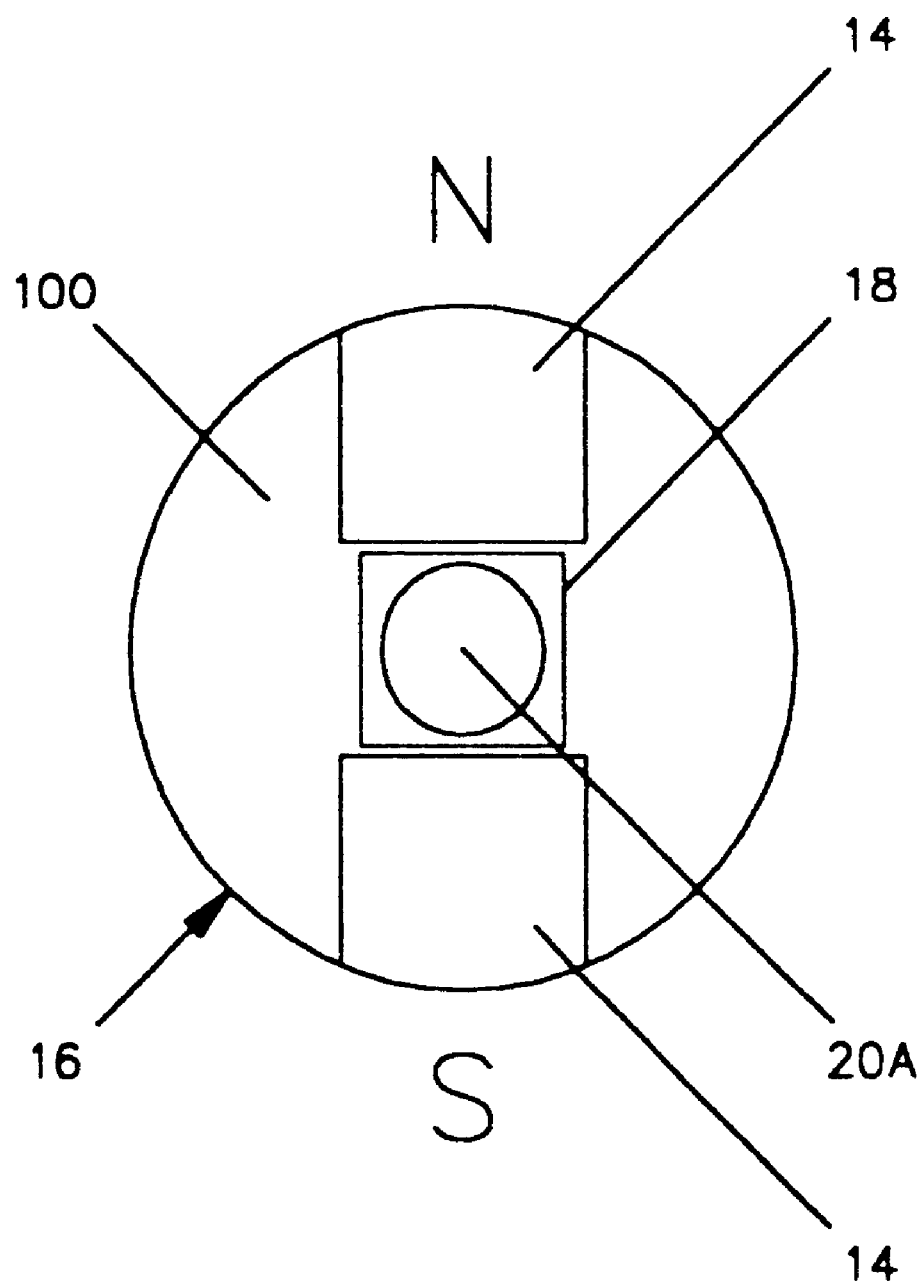
FIG. 2 is a side view of magnetic rotor 16.

Referring to FIG. 1A, a drive coil assembly 13 consists of a receiving coil 10 adjacent to a drive coil 12 having a drive coil wire 78 and a drive coil wire 78A, said drive coil 12 holds a bipolar magnetic rotor 16 so journaled and secured to a shaft 20A by a bearing 120B and a bearing 120C whereas a magnetic coupler 96C is attached to a point 122D, adjacent to momentary starter 40 and said bipolar magnetic rotor 16 has, as referred to in FIG. 2 a core element 18 with suitably attached plurality of a high BH.sub.max permanent magnet 14, said bipolar magnetic rotor 16 with a bonding filler 100 to limit air drag in system.

Figure 4:
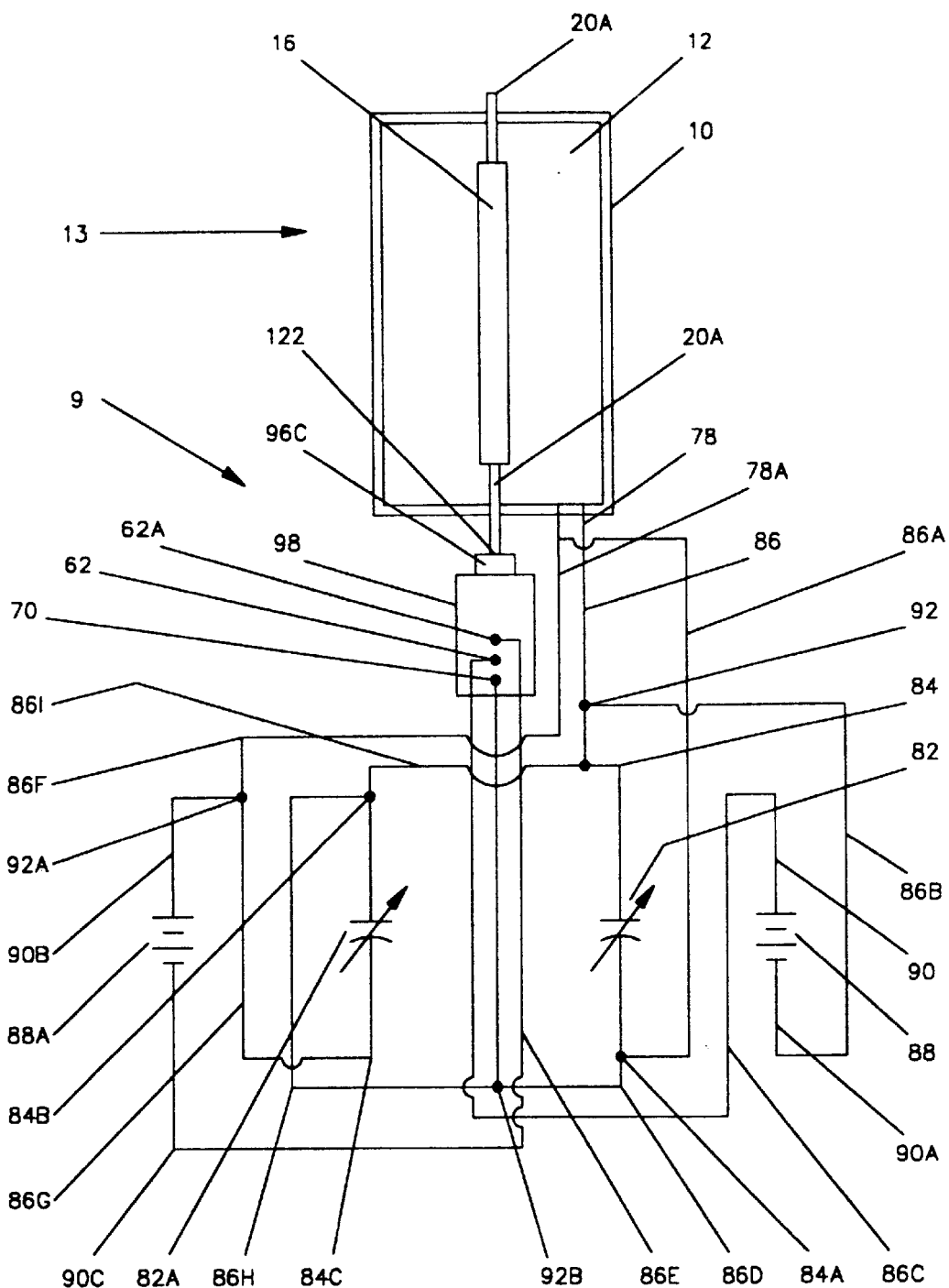
FIG. 4 is a schematic view of my invention.

Referring to FIG. 4, is a schematic diagram of main components; a DC battery 88, a DC battery 88A, a capacitor 82, a capacitor 82A, a receiving coil 10 so adjacent to a drive coil 12 having a drive coil wire 78 and a drive coil wire 78A, said drive coil 12 has an air gap so between bipolar magnetic rotor 16, so affixed to a shaft 20A at a point 122 is magnetic coupler 96C to so connect said bipolar magnetic rotor 16 to a hermetically sealed container 98. Connected to said drive coil wire 78 is a wire 86 which so connects to a junction 92 joining a wire 86B and capacitor terminal 84, said wire 86B is connected to a battery terminal 90A and a battery terminal 90 is then connected to a wire 86C that attaches to a terminal 62, said drive coil wire 78A is attached to a wire 86A which then attaches to a capacitor terminal 84A, a wire 86D completes the circuit by joining said capacitor terminal 84A and a primary conductor terminal 70 at a junction 92B. Then, said drive coil wire 78A, is attached to a wire 86F then joining a wire 86G at a junction 92A so connecting battery terminal 90B, a battery terminal 90C is attached to a wire 86E so attached to a terminal 62A, and said wire 86G then attaches to a capacitor terminal 84C, a capacitor terminal 84B has attached both a wire 86H and a wire 86I, said wire 86I is attached to said wire 86 which is so joined to said drive coil wire 78. The multiplex detector has an array ,30 which ends at terminal 62C.

Figure 5:
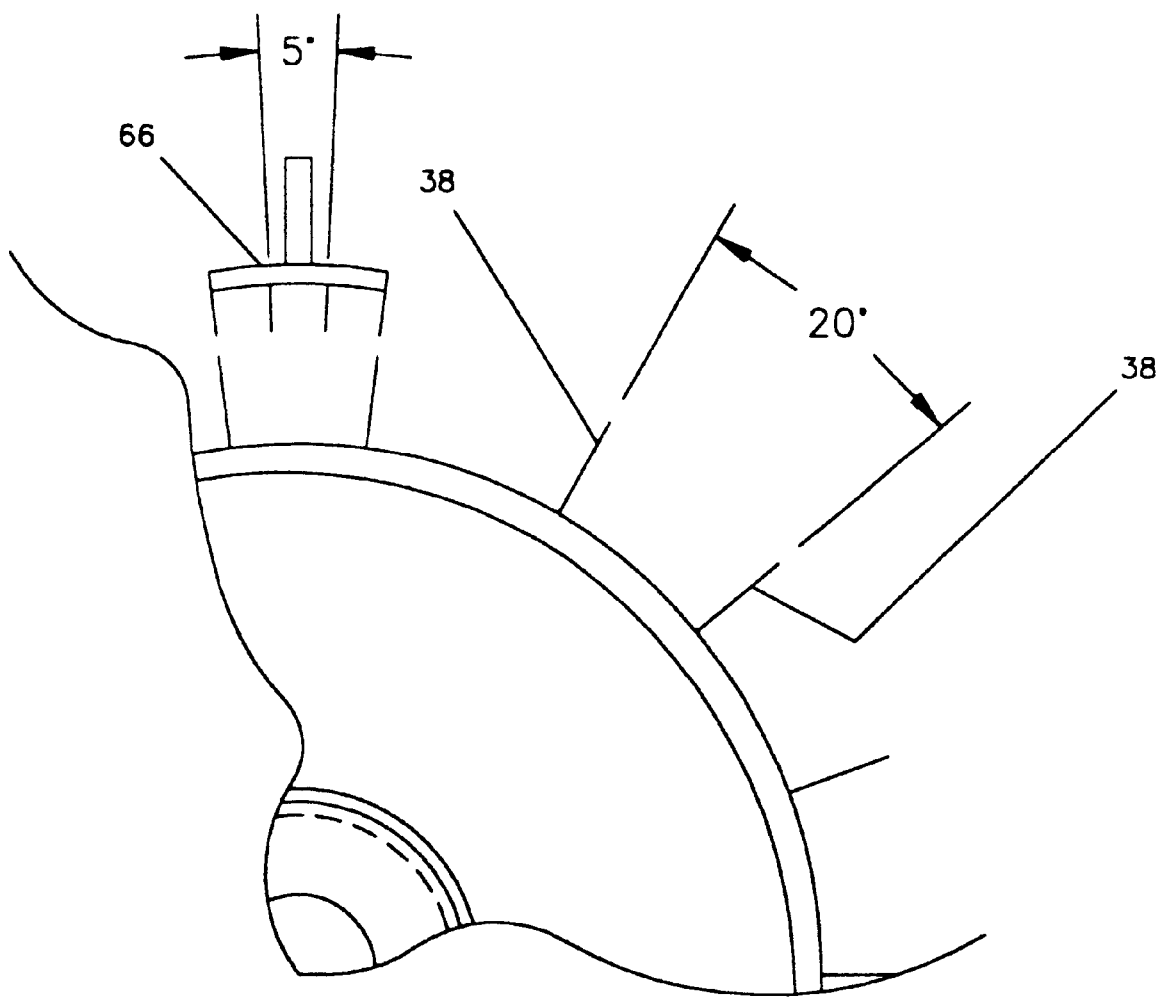
FIG. 5 is a partial view of an alternate contact placement.

Referring to FIG. 5; is a partial view of an alternate configuration of the contacts, showing contacts 38 and 66 in relation to radial spacing in degrees.

Preferred—Operation

In the power generating electromagnetic motor 9 according to the present invention, a drive coil assembly 13 consists of a drive coil 12 and a bipolar magnetic rotor 16 so composed of a sufficient number of high BH.sub.max permanent magnet 14 elements designed in a cylindrical form with a uniform arcuate curve and an air gap between it and said drive coil 12. Said bipolar magnetic rotor 16 is designed to have a core element 18 composed of a soft iron or even an insulator, in either case steel laminates are not preferred whereby steel laminates should be prohibited from use in the drive coil 12 as their resultant drag against said high BH.sub.max permanent magnet 14 elements is proven, and creates power loss, increased power consumption, hysteresis & eddy current travel. Said core element 18 and said shaft 20A car be composed of other materials chosen from the group of high strength and low weight materials; such as, ceramics, carbon fiber composites, or titanium. Said bipolar magnetic rotor 16 can be finished with a suitable fiberglass wrapper and Gougeon bonding products or other suitable containment means. The object of a magnetic couplers 96B and C is to establish a positive magnetic lock as known to those skilled in the art, with said pulsed plasma commutator 22 as housed in a hermetically sealed container 98. The multiple function of said hermetically sealed container 98 is not limited to however includes, sealed sensor area, contaminant containment, gas vacuum, gas pressurization, radiation containment and direction. Furthermore, the magnetic couplers 96 and 96A are for adjustments of the primary without container breach or the added expense of robotics. The basic components associated with the plasma stream as housed in said hermetically sealed container 98 wherein said commutator 22 consists of; conductive rings 28 and 28A, ring contacts 46 and 46A, contacts 38 and 38A as well as contact 66 are, selected from the group of high melting point conductors, not limited to yet however in this case, platinum and tungsten.

An array 80 having a terminal 62C is a multiplex sensor to track various radiation levels, charged particle clusters, discrete particles, discrete waves, EV and possible NEV as referenced in U.S. Pat. Nos. 685,957, 5,034,183 and 5,208,844. Under the influence of U.S. Pat. No. 512,340, the system will display self-capacitance upon the removal of said capacitors (82) and (82A) resulting in increased levels of pulsed plasma energy and magnification of discrete properties. The suitable spacing of radial contacts 38 and 38A has been found to be near 5 degrees between each radial contact so affixed to a lobe, however such adjustments to voltage and capacitance can effect optimal spacing allowing even closer spacing as long as an intermittent firing sequence is maintained. Thereof one can predict the use of fewer radial contacts and increased as well as staggered positioning of the primary contact 66 as in FIG. 5 showing, a 20 degree spacing is compensated by multiple primary contact 66 spaced at a 5 degree radius. A further option for contact placement include positioning the radial contacts facing inward toward a central primary contact as well as other spacing is possible, as long as the full pulsed cycle is maintained between each firing sequence, unless a fractional area of the wave form must be isolated for specific use.

Figure 8:
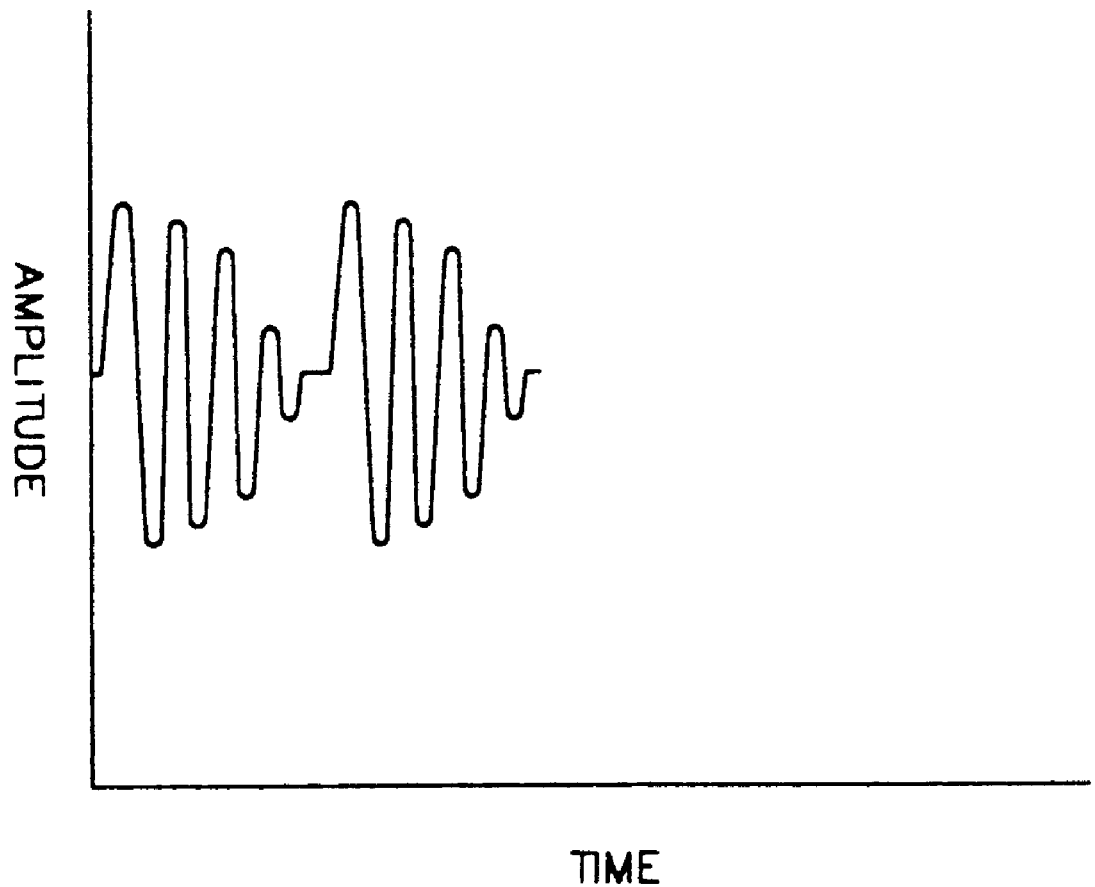
FIG. 8 is the general waveform.

Proper voltage is applied to the system as referred to in FIG. 1; momentary starter 40 is activated, initiating the rotation of bipolar magnetic rotor 16 as referred to in FIG. 1A, resulting in the annular rotation of said pulsed plasma commutator 22 aligning a radial contact 38 into electrical contact with primary contact 66 of primary firing assembly 64, it is only necessary to move the commutator a maximum of 15 degrees or until electrical contact is made. When contact is made a pulse of electrical energy is sent into the drive coil 12 where resultant electromagnetic force causes the rotor 16 to move, resulting in a break in the electrical flow as contacts disconnect in passing. This break causes a collapsing of the electromagnetic field, squeezing the electrical charge from the drive coil 12 resulting in tremendous force buildup as the charge attempts to leave, yet is trapped within the system. At this time an undamped AC current component is introduced into the system which may act to recondition the DC batteries or add discrete components useful to this system. It is at this point extremely high voltage potentials are reached and nuclear bond breakdown occurs forming x-rays, anti-matter components, EV charged particle clusters as well as others. I believe the electrical collapse is responsible for stripping sub-atomic components from the retreating charge, not able to fully retreat, whereby removing its natural balance, a balance is sought within the system pulling at forces through the insulators themselves. Because the natural balance has been altered, now trapped it attempts equilibrium through nuclear attraction of exterior matter from within or without our current space-time reference, producing the physical presence of entropy in the system. The excess charge which now is lacking within the system, radiates in the plasma at primary contact 66. Whereas the dis-equilibrium within the system is spread throughout a relatively large amount of matter and can be considered dilute, whereby the excess charge now radiating within the plasma is extremely compact and potent. Energies heretofore called counter-EMF should slow rotation, yet do not show this effect and are believed to be converted into or part of the AC component which radiates to the external receiving coil for recycling. What appears to happen is, the energy of resultant discrete and counter-EMF force is sent into resonance with the circuit of the capacitor 82, drive coil 12, and DC battery 88 whereby trapping this energy in a fluctuating waveform of decreasing amplitude as referred to in FIG. 8. This is only one form of energy radiating from the system and can be collected at a distance from the system As the waveform subsides and with proper rotation, inertia in the rotor 16 brings the next radial contact into connection with the primary contact 66 repeating the process until the next lobe of contacts is reached. When the primary contact is aligned with the next radial contact the voltage is so switched in relation to the former, each point in succession fires voltage directly into the drive coil that now forms a resonant circuit with capacitor 82A and battery 88A. The primary contact is both the anode and cathode, however in alternate lobe contact. In only the most basic form, this system runs in accordance to a DC motor however by novel means, as known to those skilled in the art this is a sub-atomic particle generator operating with anti-matter factors.

As the commutation means reduces power consumption to heretofore unattainably low current draw, I believe U.S. Pat. No. 685,957 will be of assistance in running the aforementioned device from the radiant energy not normally accessible within or out of the atmosphere.

Referring to FIG. 4, is a schematic view of the invention described in the main embodiment.

Pulsed Plasma Communicator —Description

A novel pulsed plasma commutator 22 as detailed in FIG. 3, is secured by a tube retainer 74 in a shaft insulator tube 26 so affixed is a non conductive disk 24, thereon its peripheral face 36 is an arched lobe 32 holding radial contacts 38, said arched lobe 32 is affixed to a conductor wire 42 so affixed to an annular conductive ring 28 in sliding contact with a ring contact bar 46 so affixed to a tension bar 50 so attached to a conductor wire 42 ending at terminal 62 and said tension bar 50 is attached to a tension spring 54 terminating at post 116. Counterpoised to said arched lobe 32 are radial contacts 38A thus affixed to an arched lobe 32A so affixed to a conductor wire 42A so connected to an annular conductive ring 28A in sliding contact with a ring contact bar 46A thus attached to a tension bar 50A so attached to a conductor wire 42C ending at terminal 62A and said tension bar 50A is attached to a tension spring 54A terminating at post 116A.

Pulsed Plasma Commutator—Operation

The pulsed plasma commutator 22 operates as in the main embodiment however, can be attached to a standard DC motor by one skilled in the art, as it is not just a DC motor I desire to protect, its main component is the commutator.

Plasma Drive Solenoid—Description

Figure 6:
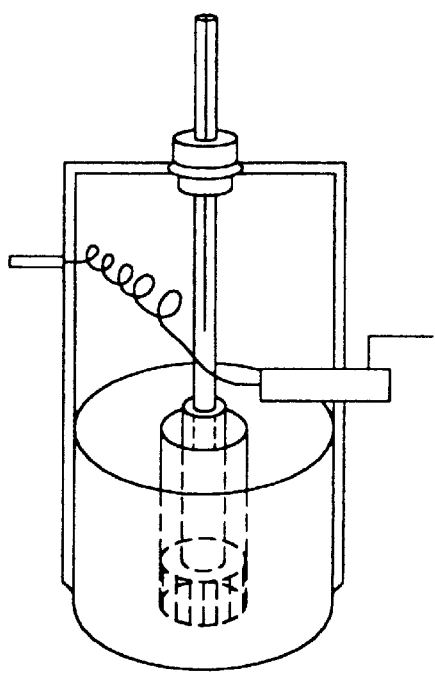
FIGS. 6 and 6a are an alternate embodiment and new use solenoid.
Figure 6A:
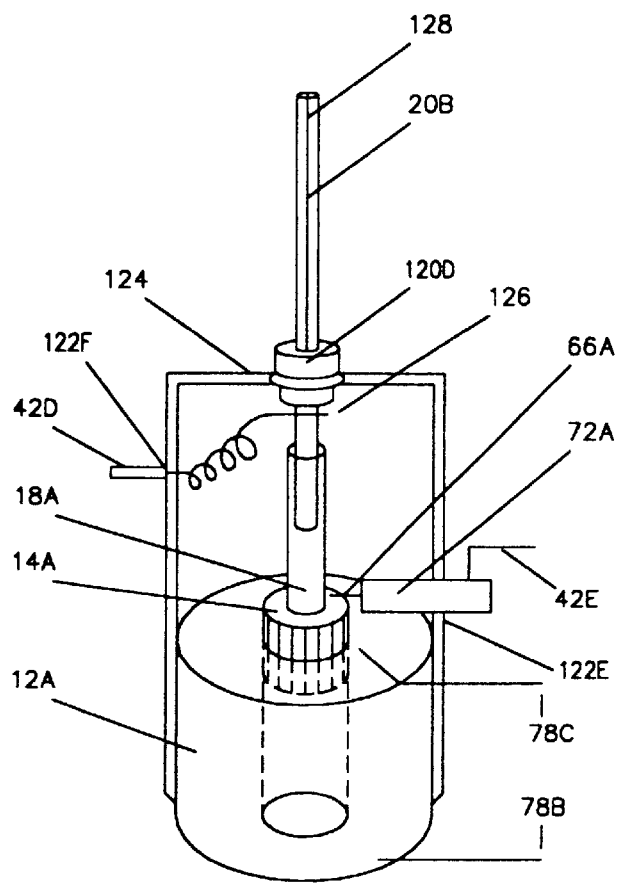

Referring to FIG. 6 and 6A is a novel use pulsed solenoid 6 consisting of a drive coil 12A having a drive coil wire 78B and a drive coil wire 78C, within said drive coil 12A is a high BH.sub.max permanent magnet 14A so connected to a core element 18A so connected to a shaft 20B which is journaled through bearing 120D and held in position by a slot 128 as suitably journaled, said shaft 20B has suitably affixed a contact 126 which is connected to a conductor wire 42D which so connects to a suitable point 122F on frame 124 of which is suitably connected to said drive coil 12A. At a point 122E on said frame 124 is attached a primary adjustment means 72A which holds a primary contact 66A, a conductor wire 42E is attached to said primary contact 66A through said primary adjustment means 72A.

Plasma Drive Solenoid—Operation

The pulsed solenoid 30 can now benefit from the heretofore destructive forces of the collapsing electromagnetic field and also generate power on post plasma discharge on assent as in FIG. 6A showing maximum extension, and at rest as in FIG. 6 which refers to starting position. Battery power and capacitance is applied in a standard manner as know to those skilled in the art, to drive coil 12A at drive coil wire 78B and conductor wire 42D whereas drive coil wire 78C is attached to conductor wire 42E of primary adjustment means 72A which is positioned at a point 122E on an insulated frame 124. A bearing 120D is preferably constructed of Teflon (tm), for long lasting service as well as hold a shaft 20A also preferably constructed of Teflon (tm) or such material coated in it in a stable gliding position by slot 128, so alignment is maintained between contact 126 and primary contact 66A for proper voltage transfer. Said shaft 20A can take any formed shape that matches receptacle of said bearing 120D so long as alignment of said contact 126 and primary contact 66A is maintained. Said contact 126 is connected to conductor wire 42D so suitably affixed to suitable point 122F on said frame 124. When voltage is applied to this unit at rest, the primary contact 66A is in contact with contact 126 producing a flow of electricity through said drive coil 12A thereby producing a magnetic field. This magnetic field pulls the high BH.sub.max permanent magnet 14A toward said bearing 120D with one reactive pulse, next the field collapses as the connection is broken sending a burst of counter-EMF into the system, however now the electrical contact is broken, trapping the counter-EMF energy between the said drive coil 12A and the DC batteries and capacitors, now pushing the magnet further away by the very virtue of the opposite energy pulse called counter-EMF. Once the said high BH.sub.max permanent magnet 14A has reached its farthest point of travel, the spring begins sending the said high BH.sub.max permanent magnet 14A on a return trip into the drive coil 12A, however now the said high BH.sub.max permanent magnet 14A must generate current as it cuts through the conductor. This unit will cycle until power is removed. Said high BH.sub.max permanent magnet 14A seems best connected to shaft 20A by a non conductive core element 18A, so not to add to hysteresis heating or eddy current transfers.

It is well known that extremely high voltages can be produced from a small voltage when run through a standard ignition coil or solenoid, however the contacts are quickly eroded if upper limits are passed and a steady current must be applied which produces inductive and conductive heating. By the use of conductors chosen from the group of high melting point materials, in this case tungsten and platinum are used, not only are the problems of the past virtually eliminated, new and heretofore unrealized energies are produced at little energy expense as heat rise is severely limited and at times reversed, as the intermittent pulsed current means will not allow power draw from the batteries for 99 percent of a full cycle, as only one pulse per cycle is possible. This extra energy has always been present, yet wasted by applied cooling means and heat losses, furthermore suppressed because a means had not previously been found to control it. Testing has shown electrolysis at 1–2 watts powder draw as well as unmeasured strong mechanical energies being available, yet not drawn off the system. Normal electrolysis generally cannot noticeably occur at 1–2 watts, therefor I believe its cause is charged particle cluster formation, whereby possible transmutation can occur.

Pulsed Plasma Spark Gap—Description

Figure 7:
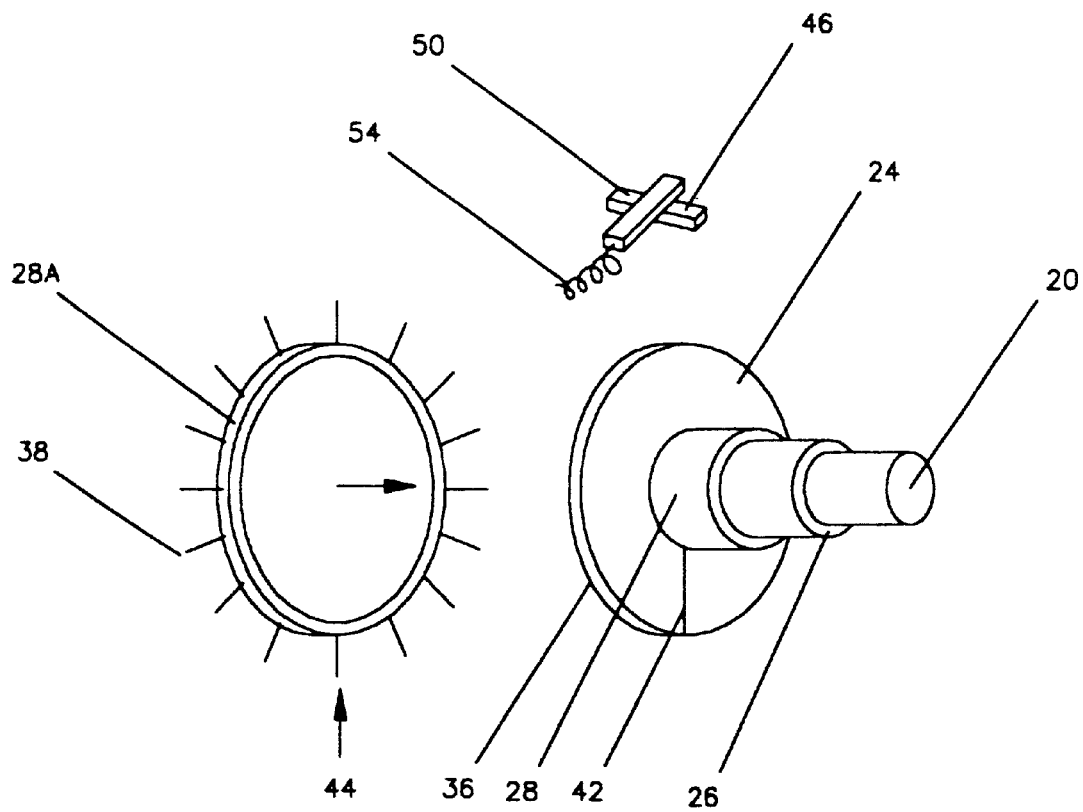
FIG. 7 is an alternate embodiment and new use rotary spark gap.

In reference to FIG. 7; a pulsed plasma spark gap 44 consisting of: a shaft 20 having affixed a shaft insulator tube 26 so affixed is an annular conductive ring 28, attached to said non conductive disk 24 is an annular conductive ring 28 and connected thereon at a peripheral face 36 is an annular conductive ring 28A so joined with said annular conductive ring 28 by a conductor wire 42 and said annular conductive ring 28A has so affixed a plurality of radial contacts 38. In sliding contact with said annular conductive ring 28 is a ring contact bar 46 so joined to a tension bar 50 having a conductor wire 42B affixed thereon. A tension spring 54 joins said ring contact bar 46 to post 116, not shown, which is suitably anchored.

Pulsed Plasma Spark Gap—Operation

In the pulsed plasma spark gap according to the present invention, a motor of variable speed, not shown, is attached to said pulsed plasma spark gap 44 and rotation begins after a selected voltage is supplied to primary contact 66 and conductor wire 42B whereas radial contacts 38 will repeatedly make contact with primary contact 66. As a rotary spark gap is known to those skilled in the art, its basic function is also similar however, novel and unique features are evident. Contacts 38, 66, 28 and 46 are made of materials selected from the group of high melting point electrical conductors, in this case they are tungsten and platinum however iridium as well as others may be substituted. Uses include the driver for the receiving coil of my pulsed plasma power generating electromagnetic motor 9 whereby a pulsed discharge field will incrementally draw collected charge from said receiving coil to pulse power other devices. A Tesla coil may also be driven by this device allowing greatly extended use with increased potentials and a faster plasma blow-out between cycles, allowing for higher frequencies and voltage potentials in the secondary.

An alternate use is toward a tabletop device of similar means as said power generating electromagnetic motor 9, minus the rotating magnetic field of the bipolar magnetic rotor 16. In this case the gap 44 is attached to a suitable coil, DC batteries and capacitance. The resultant plasma flow between contacts 66 and 38 will produce suitable discrete particles and wave activity to prove its novel use in the field of sub-atomic particle discovery.

Conclusions, Ramifications, and Scope

Accordingly, it can be seen that the power generating electromagnetic motor 2 using a pulsed plasma commutator 22 has novel and heretofore thought impossible operating means, however the prototypes consistently produce effects sought after in sub-atomic particle physics, whereby acting like a DC motor one may not realize its true potential as a tabletop charged particle cluster producer. I believe one by-product is radiation at a nuclear level whereby other sub-atomic particles are released as charged particle clusters causing for one, transmutation due to the particle seeking rebalance when striking another. Historical theory suggests X-ray production occurs at a potential near 70 KV, however current literature has proven much lower potentials are required. Advances in this new technology could lead to a low cost, low power draw, low, weight, portable, and useful X-ray unit as can be produced for unlimited applications as well as emergency and long range use. I believe a possible cause for heat loss in some applications is due to one or a combination of discrete wave/particle, anti-matter production/release, influence of charged particle clusters or possibly a harmonic sympathy with a space/time component. Still stranger, is the resultant heat loss from within the system, also heretofore thought an impossibility. I believe an anti-matter component is responsible for the heat loss, however other factors may be involved.

Although the description above contains many specificity's, these should not be construed as limiting the scope of the invention but as merely providing illustrations of some of the presently preferred embodiments of this invention. Various other embodiments and ramifications are possible within it's scope. For example, other arrangements of the components and contact means are possible as well as needed in configurations of more than one driving coil. In the case of a driver for a heretofore simple solenoid, reconstruction of components as referred to in FIG. 6, as zero spark suppression represents the means whereby novelty is proven.

The optimal spacing of radial contacts 38 and 38A has been found to be 5 degrees, however such adjustments to voltage and capacitance can in effect alter this perimeter, allowing for even closer spacing as long as an intermittent firing sequence is maintained. Therefore one can predict the use of fewer radial contacts and increase as well as stagger the positioning of the primary contact 66 as in FIG. 6. Here, a 20 degree spacing is compensated by multiple primary contact 66, each now spaced at 5 degrees. Although this technology was assumed unworkable, it teaches a new principle of operation having many unique and unexpected properties around and within the forming plasma. It is my belief, that this plasma means could lead to subatomic and discrete field manipulation, including possible gravity and time/space distortion.

Thus the scope of the invention should be determined by the appended claims and their legal equivalents, rather than by the examples given.

What is claimed is:

1. A pulsed plasma electromagnetic motor/generator comprising:
    a DC battery power supply;
    a pulsed plasma commutator for transmitting energy to said motor/generator, having no spark suppression means;
    a drive coil assembly means for the motor generator;
    and a bipolar magnetic rotor for the motor/generator having a or plurality of high BH.sub.max magnetic element disposed on a core element.

2. The electromagnetic motor/generator of claim 1 wherein said zero spark suppression commutator means comprises:
    at least one primary contact; said primary contact allows only intermittent voltage flow to each radial contact when said radial contacts are in motion;
    an annular lobe or plurality of said lobes having a radial contact or plurality of said radial contacts so affixed;
    an annular ring is connected to each said annular lobe and each said ring is in sliding contact with a ring contact bar for transmission of voltage; all points of electrical contact are made of materials selected from the group of high melting point electrical conductors.

3. The electromagnetic motor/generator of claim 1, wherein said drive coil assembly means comprises:
    at least one drive coil having a bipolar magnetic rotor defining there between an air gap;
    said rotor is connected to the said commutator;
    said magnetic rotor includes:
        a high BH.sub.max permanent magnet or plurality thereof 36 MGOe or greater so disposed upon a core element.

4. A bi-polar magnetic rotor as claimed in claim 1, wherin the BH.sub.max value of the high BH.sub.max permanent magnet is at least 50 MGOe.

5. A bi-polar magnetic rotor as claimed in claim 1, wherein the BH.sub.max value of the high BH.sub.max permanent is at least 100 MGOe.

6. The electromagnetic motor/generator of claim 1, where said commutator is enclosed within a sealed container for a controlled application of a vacuum, a gas, or gasses to react with said plasma.

7. The electromagnetic motor/generator of claim 1, where a sealed housing encloses said drive coil means and said commutator to provide zero aerodynamic drag in a vacuum.

8. The electromagnetic motor/generator of claim 1, having an induction coil to transform generated electromagnetic pulses transmitted from said drive coil at a discrete distance causing minimal to zero system losses.

9. The electromagnetic motor/generator of claim 1, having no bi-polar magnetic rotor, commutator movement being supplied by external motive means.

10. The electromangnetic motor/generator of claim 1, where a plasma force causes a joining or separating of elemental particles contained within an enclosed gas, gasses, or said plasma.

11. A pulsed plasma commutator with no spark suppression means for an electromagnetic motor/generator comprising;
    one or a plurality of annular lobes on the commutator,
    one or a plurality of radial contacts points so affixed to each annular lobe with each annular lobe connected to an annular ring whereas each end of said lobes are attached equidistant to each other;
    each annular ring having a ring contact bar;
    at least one primary contact where said primary contact allows intermittent flow of electricity when said radial contacts are in motion;
    all said contacts and said points being made from materials selected from the group of high melting point electrical conductors.

12. The electromagnetic motor/generator of claim 11, where said commutator is enclosed within a sealed container for a controlled application of a vacuum, a gas, or gasses to react with said plasma.

13. The pulsed plasma commutator of claim 11, where a plasma force causes a joining or separating of elemental particles contained within enclosed gasses.

14. A pulsed plasma commutator having zero spark suppression means comprising:
    a plurality of radial contacts are affixed to an annular ring, said annular ring is affixed to the peripheral surface of a non-conductive disk and the annular ring is connected to a small annular ring for electrical transmission through a ring contact bar having said commutator enclosed with a sealed container so application of a vacuum, gas, or gasses may allow a discrete reaction with said plasma of said commutator, all said contact surfaces and said points are made of materials selected from the group of high melting point electrical conductors.

15. The pulsed plasma commutator of claim 14, where a plasma force causes a joining or separating of elemental particles contained within enclosed gasses.

16. The pulsed plasma commutator of claim 14, having a drive coil assembly means, a bipolar magnetic rotor, and an induction coil at a discrete distance to transform generated electromagnetic pulses from said drive coil causing minimal to zero system losses.

* * * * *